(12) United States Patent
Skeide et al.

(10) Patent No.: US 12,458,144 B2
(45) Date of Patent: Nov. 4, 2025

(54) MECHANICAL SEATING DEVICE WITH AN AUTOMATICALLY ADJUSTED HEADREST

(71) Applicant: H2 NORWAY AS, Ålesund (NO)

(72) Inventors: Havtor Hofset Skeide, Ulsteinvik (NO); Lars Inge Solnørdal Jakobsen, Ørskog (NO); Rune Jonsen, Valderøya (NO)

(73) Assignee: H2 NORWAY AS, Ålesund (NO)

( * ) Notice: Subject to any disclaimer, the term of this patent is extended or adjusted under 35 U.S.C. 154(b) by 339 days.

(21) Appl. No.: 18/271,419

(22) PCT Filed: Jan. 11, 2022

(86) PCT No.: PCT/NO2022/050008
§ 371 (c)(1),
(2) Date: Jul. 7, 2023

(87) PCT Pub. No.: WO2022/149988
PCT Pub. Date: Jul. 14, 2022

(65) Prior Publication Data
US 2024/0057771 A1 Feb. 22, 2024

(30) Foreign Application Priority Data
Jan. 11, 2021 (NO) .................................. 20210031

(51) Int. Cl.
*A47C 1/032* (2006.01)
*A47C 1/036* (2006.01)
*B60N 2/862* (2018.01)

(52) U.S. Cl.
CPC .............. *A47C 1/032* (2013.01); *A47C 1/036* (2013.01); *B60N 2/862* (2018.02)

(58) Field of Classification Search
CPC ..... A47C 1/032; A47C 1/036; B64D 11/0641; B60N 2/862
See application file for complete search history.

(56) References Cited

U.S. PATENT DOCUMENTS 5,472,261 A * 12/1995 Oplenskdal ............ A47C 1/036
297/284.4
5,823,619 A * 10/1998 Heilig .................... B60N 2/888
297/216.12

(Continued)

FOREIGN PATENT DOCUMENTS

DE 20309205 U1 * 8/2003 ............. A47C 1/036
JP 2006204959 A * 8/2006

*Primary Examiner* — Timothy J Brindley
*Assistant Examiner* — Jessica Kathryn Thompson
(74) *Attorney, Agent, or Firm* — Rimon Law, P.C.

(57) ABSTRACT

A seating device includes a seat 4, a back frame 3 and a head frame 1 carried by a base 5. The back frame 3 is rotatably suspended in the base 5 at a first pivot point E, and the head frame 1 is hinged to an upper end of the back frame at a third pivot point A.
The seating device further includes a motion control lever 7 rotatably attached to the base 5 in a fourth pivot point D. A motion resisting element resists the motion of the motion control lever 7 in relation to the base 5. A pulling element 2 extend from a fifth pivot point F at a first end of the motion control lever 7 to a sixth pivot point B on the head frame. The back frame is arranged to engage the motion control lever 7. The head frame will automatically and seamlessly find the correct position in relation to the angle of the back frame 3 and the motion of the head frame will change direction from a forward motion to a backward motion when the back frame 3 is moved from an upright position, past a reclined position and to a further reclined sleeping position.

10 Claims, 8 Drawing Sheets

(56) References Cited

U.S. PATENT DOCUMENTS

| | | | | |
|---|---|---|---|---|
| 6,050,637 A * | 4/2000 | H.ang.land | ............ | B60N 2/862 |
| | | | | 297/216.14 |
| 6,179,379 B1 * | 1/2001 | Andersson | ............ | B60N 2/427 |
| | | | | 297/216.12 |
| 6,517,156 B1 * | 2/2003 | Lin | ........ | A47C 1/036 |
| | | | | 297/284.4 |
| 7,594,693 B2 * | 9/2009 | Ekornes | ............ | A47C 7/38 |
| | | | | 297/61 |
| 8,172,315 B2 * | 5/2012 | Jonsen | ............ | A47C 1/032 |
| | | | | 297/342 |
| 8,434,822 B2 * | 5/2013 | Asbjornsen | ............ | A47C 7/30 |
| | | | | 297/316 |
| 9,888,776 B2 * | 2/2018 | Brandhuber | ............ | A47C 7/18 |

* cited by examiner

MECHANICAL SEATING DEVICE WITH AN AUTOMATICALLY ADJUSTED HEADREST

RELATED APPLICATION

The present application is a national stage application of International Patent Application Serial No. PCT/NO2022/050008, filed on Jan. 11, 2022, which claims priority from NO20210031, filed on Jan. 11, 2021, the disclosure and content of which is incorporated by reference in its entirety for all purposes.

FIELD OF TECHNOLOGY

The present invention relates to a mechanical seating device with a reclining function and an automatically adjusted headrest. A head frame will automatically and seamlessly find a correct position in relation to an angle of a back frame and the motion of the head frame will change direction from a forward motion to a backward motion when the back frame is moved from an upright position, past a reclined position and to a further reclined sleeping position.

BACKGROUND

There are several known solutions for seating devices with a reclining function on the market. There are various solutions for adjusting the position of the headrest.

NO328012 describes a seating device for a recliner or sofa with an adjustable back part and an adjustable headrest, wherein the device when moving the adjustable back part is arranged to influence the angular position of the headrest relative to the back part. The headrest is allowed to move from substantially the same plane to an angular position in relation to the back part when the back part is leaned backwards. At least one movable joint in the transition between the headrest and the back part is connected to at least one friction part by means of at least one strut to allow a user to move the headrest backwards or forwards with the head or another part of the body to move the back to the desired position.

NO313365 describes a device for regulating movement of a headrest on a seating device. In a chair with an angle-adjustable back and a headrest, and where a drawbar is arranged between a part on the seat and a fastening part on the headrest, allows the angular position of the headrest to be adjusted relative to the back when the angular position of the back is change. The fastening part is pivotally mounted in the headrest with a friction coupling and a stop is provided for restricting the pivoting movement of the headrest.

NO176384 a chair, in particular a chair with an adjustable back and headrest, and is particularly characterized in that the device comprises means which affect the shape of the back of the chair depending on the inclination of the back. In particular, it is provided a distinctive lumbar support when the back is upright, and gradual reduction of the lumbar support when the back is folded back. The lumbar support cooperates with a system for regulating a headrest and its return to the normal position every time the back reaches an extreme position.

NO313783 describes a chair, in particular a chair with an adjustable back and headrest. A pulling element is arranged between a portion of the headrest and a fastening portion on the chair with, for example, a rod, which by movement of the adjustable back is arranged to affect the angular position of the headrest in relation to the back, and for the purpose of describing a headrest which can be disengaged by simple means in the lowered position of the back of the chair. Coupling means come into effect when the back of the chair is lowered, either manually or automatically.

Known art refer to devices where the head frame automatically provides head support in the reclining position and some solutions also include a manual adjustment from the reclining position to the sleeping position. The sleeping position involves in some cases that the user must lift his hands over his head and pull the head rest forward or push/push his head backwards to trigger/reset the head movement. This can be challenging for many users.

The comfort functions based on customer needs, will give the user of the seating device of the present invention an optimal sitting/lying experience in all positions and areas of use.

The three main uses of a seating device with an adjustable back are:

1. Upright position—Here the user needs good lumbar support as well as a freedom to move for shoulders, hands and head/neck.
2. Lean/read/TV position—Here the user needs a more relaxed back angle, a slightly less prominent lumbar support and a prominent neck/head support. The head should be kept in a position where the eyes have a natural position towards the TV or the book being read.
3. Rest/sleep position—Here a user needs a gentle back angle that will give a feeling of lying in a bed. A less pronounced lumbar support and neck/head support provide a comfortable position for rest/sleep. In this position, the headrest/headrest corresponds to a pillow in a bed.

There is no solution that allows you to the switch positions between the three main applications in an automatic, mechanical, integrated and seamless way.

SUMMARY OF THE INVENTION

The object of the present invention is to provide a seating device which provides an adjusted support for the head/neck in both a sitting, reclining and resting or lying position, where the movements take place seamlessly and only by means of the user's weight transfer.

The above-mentioned objects of the invention are achieved with a device as stated in the patent claims.

With design of the invention, it is possible for the user to adjust the seating device between a sitting position, a reclined reading/TV position and a resting/sleeping position only by redistributing the body weight. The headrest will automatically find the desired position without the user having to grip and adjust it to adopt the main areas of use described earlier.

The present invention concerns a seating device with a seat, a reclining back frame, a head frame and a base. The back frame is pivotally attached relative to the base in a first pivot point, and the head frame is hinged to an upper end of the back frame in a third pivot point. The back frame is adjustable between an upright position with the head frame in an upright position, a reclined position with the head frame in an upright position, and a further reclined sleeping position. The seating device includes further a motion control lever pivotally attached to the base in a fourth pivot point. A motion resisting element resist motion between the motion control lever and the base. A pulling element extend from a fifth pivot point on the motion control lever to a sixth pivot point on the head frame. An engagement element is mechanically connected to the reclining base frame. An impact face is mechanically connected to the pivoted motion control lever. The impact face and the motion control lever are adapted to be out of mechanical contact when the back frame is in the upright position with the head frame in an upright position and is adapted to be in mechanical contact when back frame is moved between a reclined position with the head frame in an upright position, and a further reclined sleeping position.

The motion resisting element resisting motion between the motion head frame and the back frame may be is located to resist motion between at least one of: the motion control lever and the base, the pulling element and the base, the pulling element and the back frame, in the third pivot point (A) where the head frame is hinged to the upper end of the back frame, the motion control lever and the pulling element and the sixth pivot point (B) between the head frame and pulling element.

The back frame may include a release arm engaging the motion control lever, and wherein the engagement element may be located on the release arm.

The motion resisting element may comprise at least one of a friction-exerting element, a compression spring, a tension spring a torsion spring, an elastic element, a pneumatic unit and a detent ball and spring mechanism.

The seat may be movable relative to the base.

The seat may be hinged to a lower end of the back frame in a second pivot point.

The seat may form a part of the base.

The first pivot point may be provided by several movable parts which create an invisible pivot point.

The seating device may further include a stop element secured to the base, adapted to limit a deflection of the motion control lever to reset the position of the motion control lever when the back frame is pushed forwards.

The seating may be purely mechanical, i.e. without any supply of electric power and without using powered actuators such as stepper motors, servo motors, etc.

DETAILED DESCRIPTION OF THE INVENTION

Figure 1:
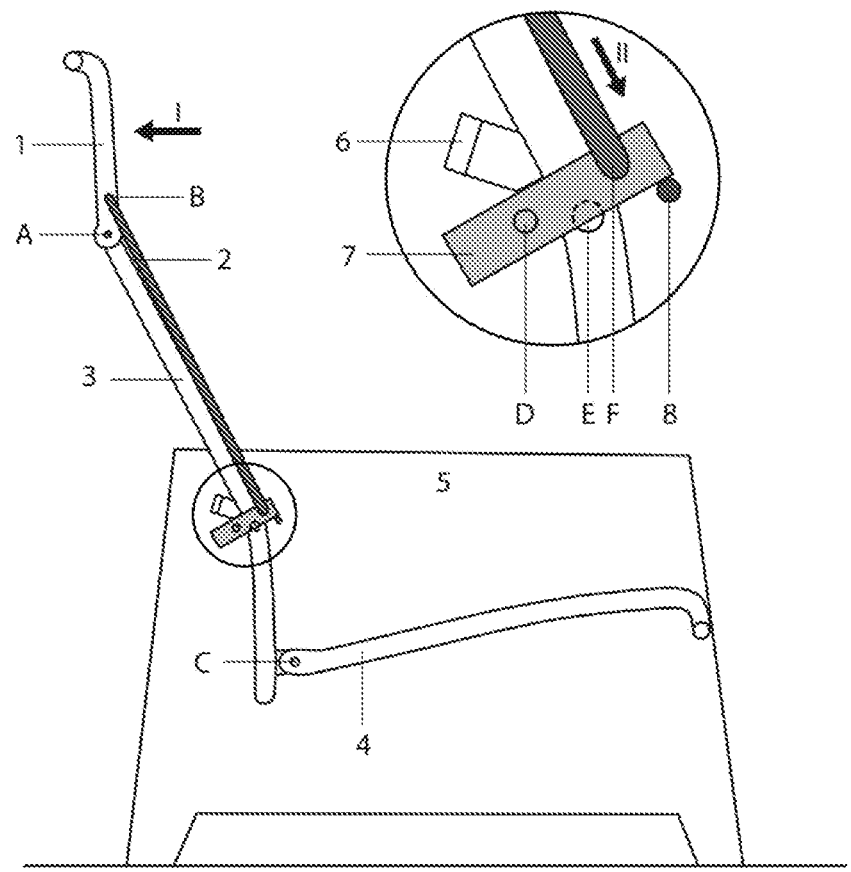
FIG. 1 is a schematic representation of a first embodiment of a seating device according to the invention in an upright position.

FIG. 1 shows a first embodiment of a seating device according to the invention in an upright position. The seating device can be any device such as a chair, sofa, etc. with a reclining function.

The seating device includes a seat 4, a back frame 3 and a head frame 1 carried by a base 5. In the figures the base is shown as side beams. The base 5 can alternatively be e.g. be a mechanism, a seat, a chassis or the like.

The invention is explained further in two of the use modes in the below description.

As FIGS. 1-5 show, the back frame 3 is rotatably suspended in the base 5 in a first pivot point E. The seat 4 is hinged to the lower end of the back frame in a second pivot point C. When the back frame rotates about the first pivot point E, the seat will move in a shallow angle back and forth. The seat can be supported by elements that hold it in place, such as sliding tubes, transverse beams on which the seat slides, taps in the sides of the seat that engage in grooves in the side members, or arms (not shown).

Figure 6:
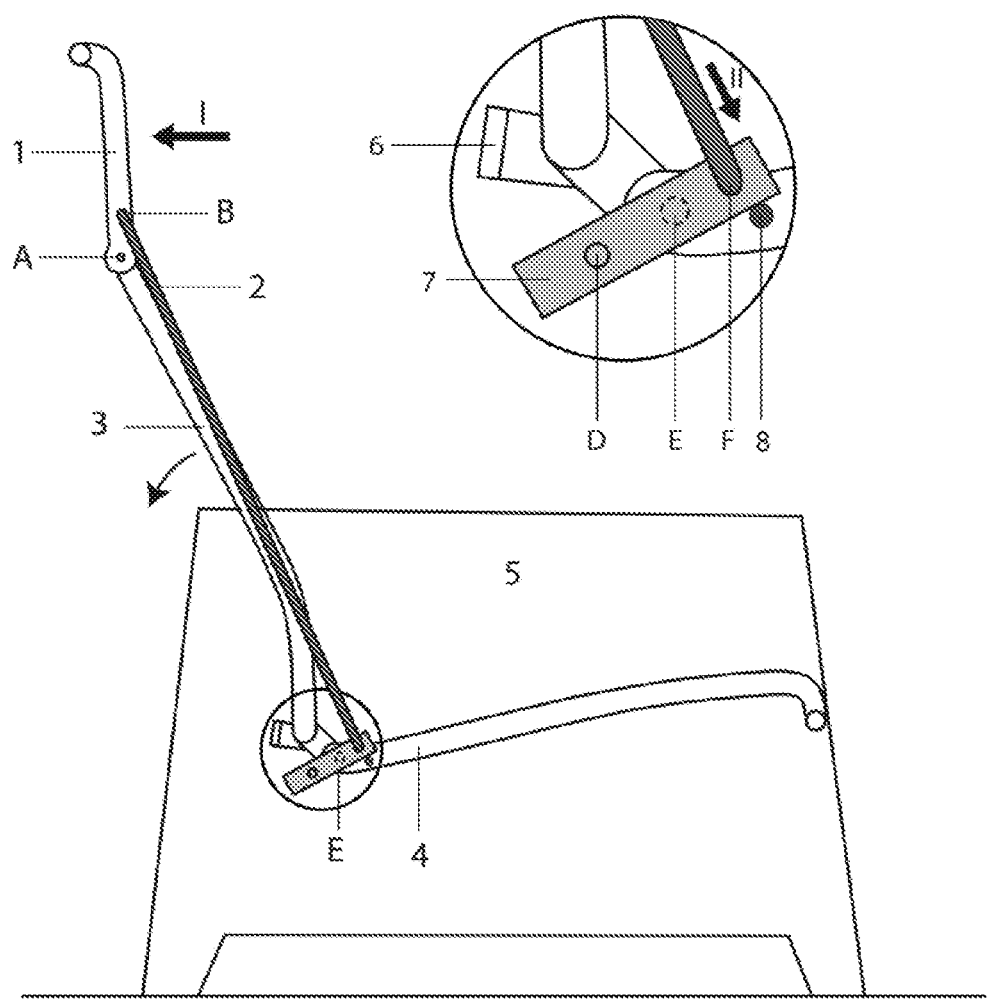
FIG. 6 is a schematic representation of a second embodiment of the seating device according to the invention.

FIG. 6 shows an alternative embodiment where the seat is included as part of the base 5 and the back frame is supported in the same base.

The head frame 1 is hinged to the upper end of the back frame in a third pivot point A. The figures show the seating device from the side. The seat, the back frame and possibly also the head frame can be supported on both sides, but also at a centre. When supported on both sides, said pivot points, etc. will have corresponding (symmetrical) units on the other side of the seating device. The corresponding units can be supported by a beam or another form of support, for example by a support frame in a sofa. The pivot points may also include shafts.

The seating device further includes a pivoted motion control lever 7 which can be fastened to all points on the base to which the back rotates, in a fourth pivot point D. The pivoted motion control lever 7 is allowed to pivot about its pivot point upon application of a force to the lever above a certain value. A motion resisting element holds the motion control lever against a stop 8 arranged on the support. The motion resisting element may be at least one of a friction-exerting element, a compression spring, a tension spring, a torsion spring, an elastic element, a pneumatic unit or the like and may be applied to all points where it holds the motion control lever against the stopper. The first (E) and fourth (D) pivot points, as well as the stopper are hereinafter described as mounted in the support.

The motion control lever 7 is connected to the head frame via a pulling and/or sliding element 2. The pulling element 2 is typically, a stay, wire, a pull-rod or the like, hereinafter referred to as pulling element 2. The pulling element goes between a fifth pivot point B on the head frame and a sixth pivot point F on one end of the motion control lever 7. The motion control lever will pull the pulling element 2 along with it to hold the head frame 1 in the position shown in FIG. 1.

A release arm 6 is further attached to the back frame. The release arm 6 and the motion control lever 7 are designed to allow the release arm 6 to engage/impact and move the motion control lever 7. The figures illustrate that the end of the release arm includes an engagement element projecting into the plane of rotation of the motion control lever 7. The release arm 6 can therefore be rotated to move the engagement element into contact with the motion control lever 7 to rotate the motion control lever 7 about the fourth pivot point D. The engagement element may include an angled part, a cam, bolt, rivet or the like which protrudes into the plane of rotation of the motion control lever and therefore has the same function. An alternative solution is that the motion control lever 7 is equipped with an angled part, cam/bolt or the like that is in the plane through which the release arm is rotated. Using this alternative solution, it is possible to omit the entire release arm 6 and let the back frame 3 itself engage the motion control lever 7.

Figure 2:
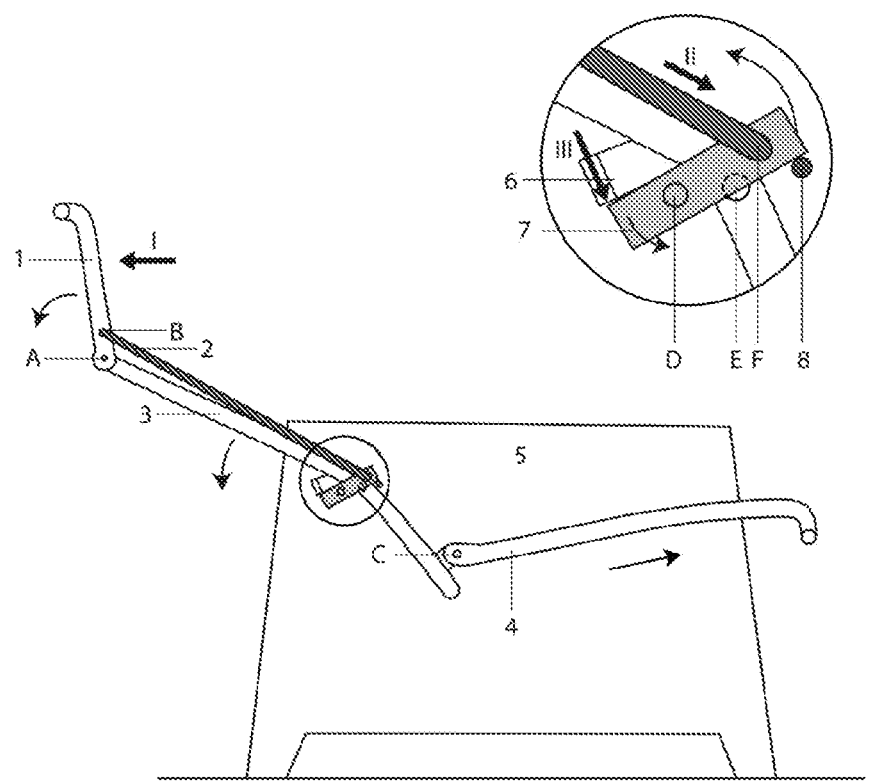
FIG. 2 is a schematic representation of seating device shown in FIG. 1 in a reclining position with the head frame kept in an approximately upright position to provide head support for e.g. TV viewing (reclined/TV position)
Figure 3:
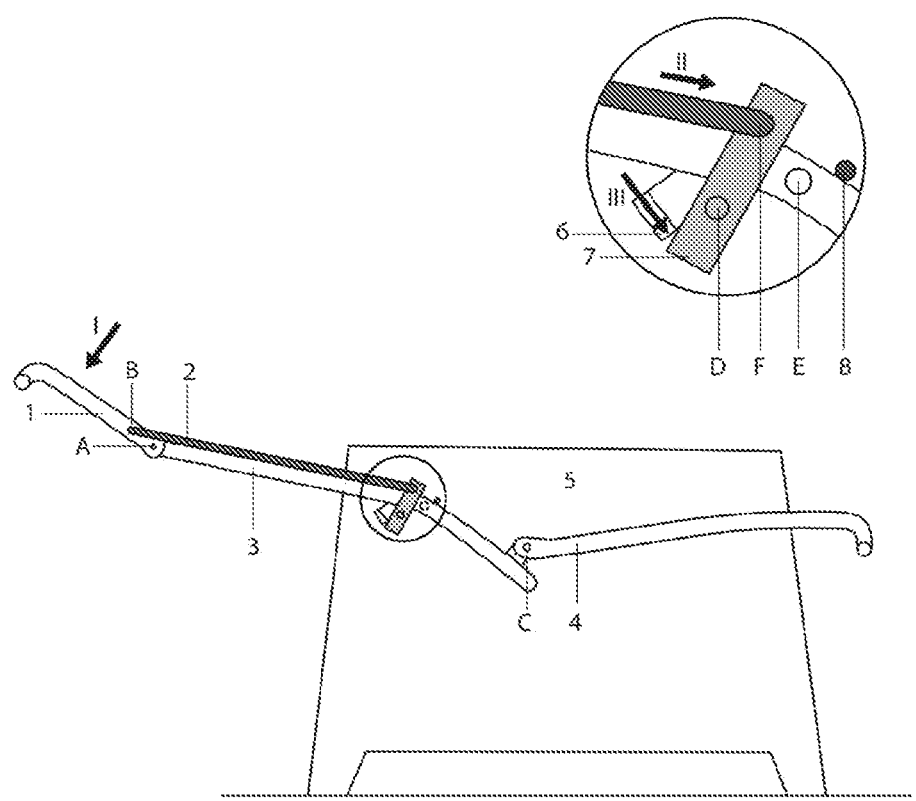
FIG. 3 is a schematic representation of the seating device in a position for lying with the head frame pushed to an open angle for rest and sleep (rest/sleep position)

The FIGS. 1-3 shows three positions of a movement pattern where a person sits upright, rests backwards with the head forward (the headrest automatically pivots forwards as normal for reading, watching TV, etc.) and lays down on the back of the seating device with the head down (the headrest automatically and mechanically pivots backwards according to the invention for the resting position).

FIG. 1 shows the seating device in an upright sitting position. Again, the motion control lever 7 abuts the stop element 8 and holds the head frame 1 in a suitable position. The engagement element of the release arm 6 is at a distance from the motion control lever 7. The engagement element of the release arm 6 is thus not in contact with the motion control lever 7, and the motion control lever 7 holds the pulling element 2 to prevent it from moving.

FIG. 2 shows the seating device in the reclining/TV position. The back frame is tilted backwards, and the seat is pushed up and forward. In this position, the head frame 1 retains approximately the same angle in relation to the side beam/a floor and it provides good base for the user's neck/head. This provides a comfortable position for ex. watching TV. The pulling element 2 holds the head frame 1 in approximately upright position, i.e. approximately the same upright position as in FIG. 1 as the motion control lever 7 resist motion of the pulling element 2. The back frame 3 has rotated to a position where the release arm 6 is located next to the motion control lever 7. A pull in the pulling element 2 with a shift towards the seat results in a forward motion of the head frame 1, whereas releasing the pull in the pulling element 2 with a shift towards the head frame 1 results in a backwards motion of the head frame 1, towards a position closer to parallel with the back frame 3.

The motion resisting element or elements hold the motion control lever 7 in a fixed position in relation to the base 5 and the pulling element 2 pulls the head frame 1 to an upright position when the back frame moves from the upright position on FIG. 1 and to the reclined position in FIG. 2. The motion resisting element resists the users force I from the head frame, thus holding the motion control lever 7 in the fixed position. In FIG. 2, an engagement element of the release arm 6 just contacts an impact face on the pivoted motion control lever 7 without moving motion control lever 7.

The transition between FIGS. 1 and 2 requires a counterforce (II) from the motion resisting element to the user's force (I) to hold the head frame 1 in the upright position. The counterforce (II) and the stop element 8 cause the motion control lever 7 to be fixed relation to the base 5.

FIG. 3 shows the seating device in the further reclined rest/sleeping position. In this position, the head frame 1 and the back frame 3 are approximately parallel. This provides a good resting/sleeping position. In relation to FIG. 2, the back frame 3 is rotated down to an approximately horizontal position. The release arm 6 is rotated with the back frame such that an engagement element on the release arm 6 has contacted/impacted (collided) against an impact face on the motion control lever 7, thus forcing it to rotate around the fourth pivot point D against the force of the motion resisting element. The other end of the motion control lever 7 is rotated away from the stop element 8 to allow the pulling element 2 move towards the head frame 1 and to move the head frame 1 to a backwards position approximately flat in relation to the back frame.

In the transition between FIG. 1 and FIG. 2, the head frame 1 moves forwards whereas in the transition between FIG. 2 and FIG. 3, the head frame 1 moves in the opposite direction, i.e. backwards/downwards.

Figure 5:
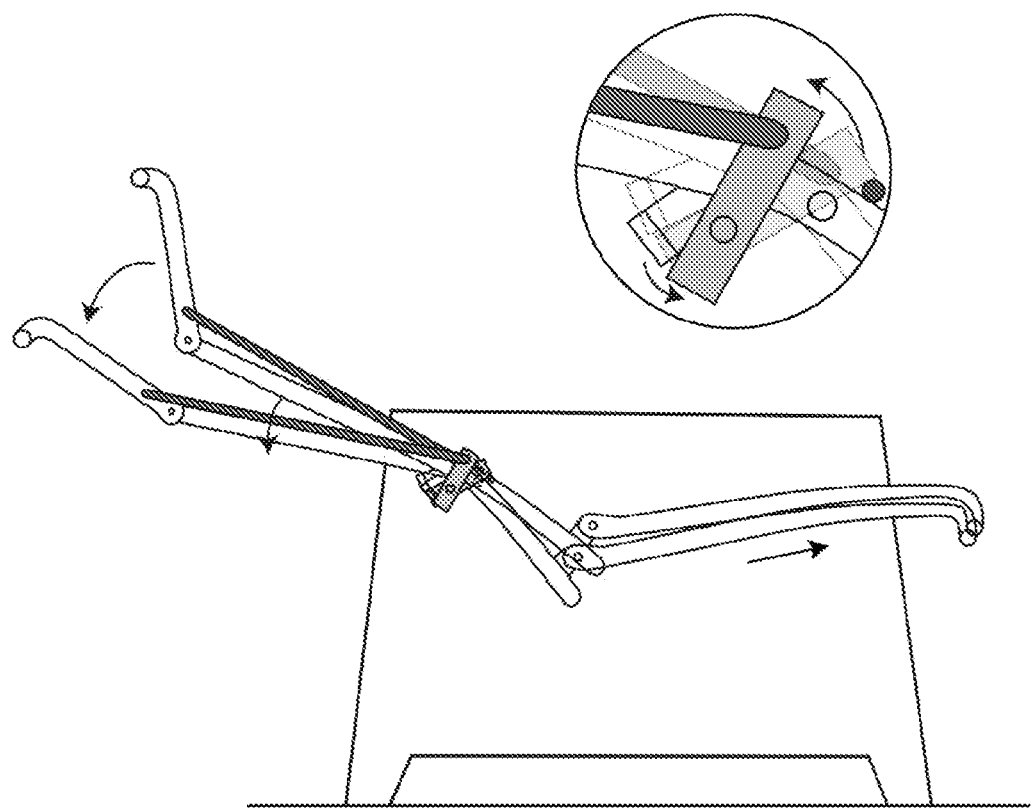
FIG. 5 shows the transfer between the reclining/TV position and the rest/sleeping position.

In the transfer between FIGS. 2 and 3, the rest/sleep position is thus activated. This only imposed by the user's weight distribution and the small angular change on the back frame 3 takes the head frame 1 the user's head/neck seamlessly to rest/sleep position. The transfer is illustrated in FIG. 5 and in the following sections the transfer is described in detail.

From FIGS. 2 to 3, the rotational force from the back frame 3 via the release arm 6 (lever/mechanical advantage force III) exceeds the counterforce (II) from the motion resisting element applied to the motion control lever 7. The motion control lever 7 then rotates about the fourth pivot point D. The difference of the distance between the sixth pivot point F and the point of impact of the release arm 6, to the pivot point D of the motion control lever (the fourth pivot point) causes the displacement to the sixth pivot point F to be greater than the displacement of the impact face between the motion control lever 7 and the release arm 6. This gives a larger angular change results in the angle between the head frame 1 and the back frame 3 opening.

If the user raises the back frame again, i.e. moves from FIG. 3 to 1, all moving parts will return to the starting position. The release arm 6 will release the contact with the motion control lever 7 to allow it to rotate back to the stop element 8.

Figure 4:
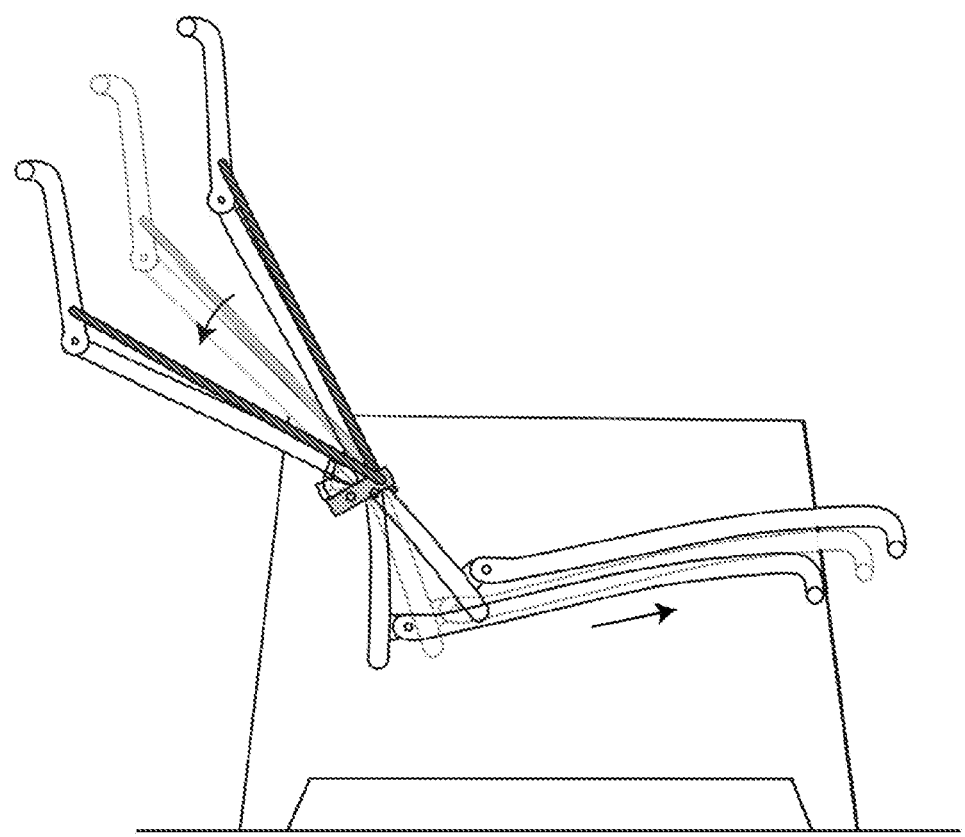
FIG. 4 shows the movement between the upright position and the reclining/TV position.

FIG. 4 shows the course of movement between FIGS. 1 and 2.

FIG. 5 shows the course of movement between FIGS. 2 and 3. At the last part of the angular change of the back frame 3, the rotation is triggered by the motion control lever 7 which pushes the head frame 1 to the rest/sleeping position.

FIG. 6 shows another embodiment of the seating device according to the invention. The seat 4 is fixed and may be attached to the side members or another form of base and may also be included as part of the base 5. The first pivot point E is moved down to the end of the seat 4 and connected to the base 5. The back frame 3 can thus be moved while the seat 4 is fixed. The back frame 3 does not have to be hinged directly in the seat 4, but the pivot point E should be close to the end of the seat for purely practical reasons. Another option is that the seat is movable in relation to the back frame. The seat can then be moved independently of the back frame, such as a folding seat. In this case, the seat can be either attached or not attached to the back frame.

Figure 7:
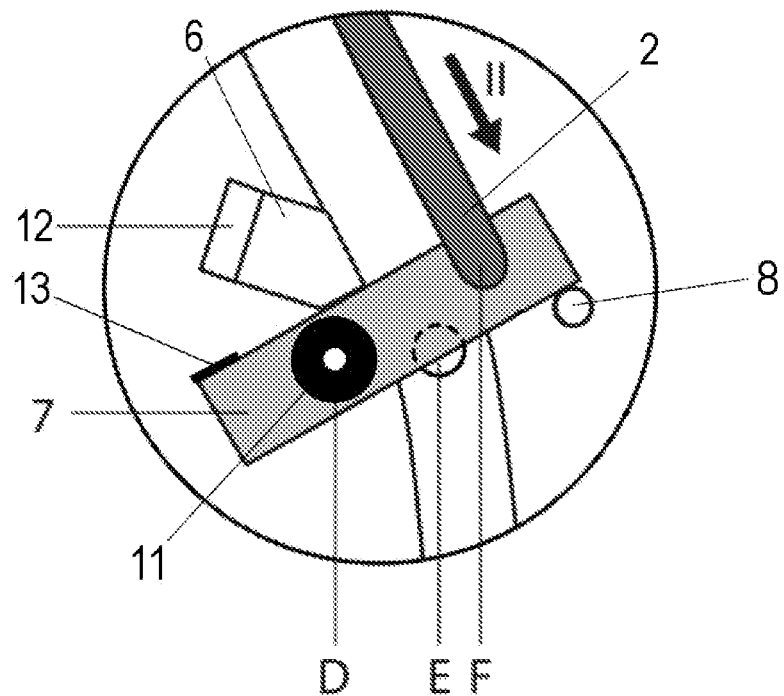
FIG. 7 is a schematic representation of a detail of the mechanism of the invention with a motion resisting element at a first location.

FIG. 7 is a schematic representation of the pivoted motion control lever 7, the pulling element 2, the release arm 6 with the engagement element 12 and the stop element 8. The stop element 8 and the pivot point of the pivoted motion control lever 7 are fixed to the base. The motion resisting element includes friction mechanism or a torsion mechanism 11 surrounding the pivot point of the pivoted motion control lever 7. In the case friction mechanism or a torsion mechanism 11 is a friction mechanism, then a face of the friction mechanism 11 can be in contact with a face fixed in relation to the base, and a face on the pivoted motion control lever 7. The friction mechanism 11 typically includes a friction disk and a biasing mechanism (spring washers, Belleville washers etc.) compressing the friction disc. The engagement element 12 of the release arm 6 is adapted to contact an impact face 13 on the pivoted motion control lever 7.

Figure 8:
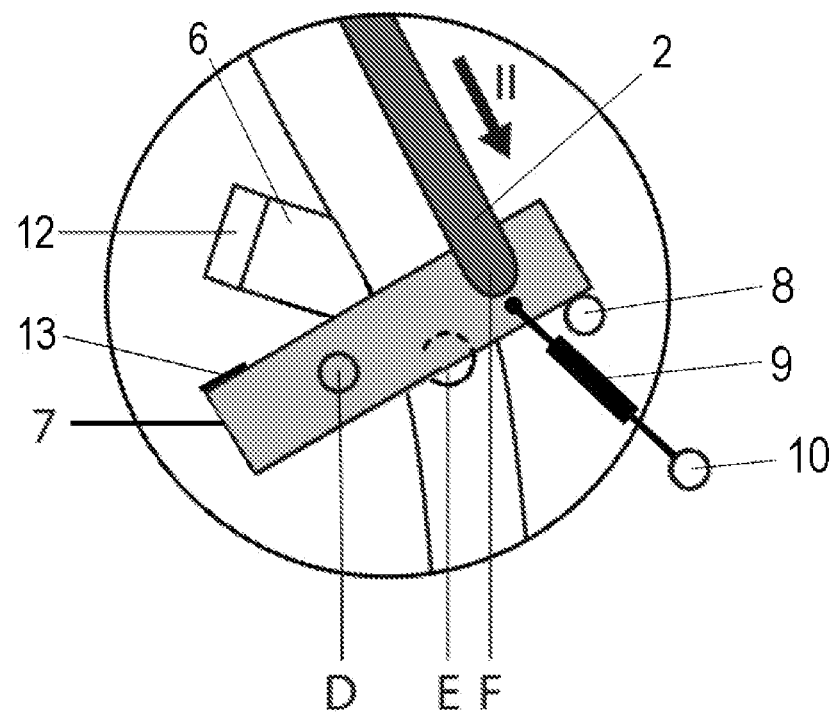
FIG. 8 is a schematic representation of a detail of the mechanism of the invention with a motion resisting element at a second location.

In FIG. 8 is the motion resisting element is at a different location compared to the embodiment of FIG. 7. The motion resisting element 9 may include a spring 9 of some sort including a gas spring, torsion spring, etc. extending between the motion control lever 7 and the attachment point 10 of the motion resisting element fixed to the base. The spring 9 may bias the motion control lever 7 towards the stop element 8. The spring 9 may also be substituted with a friction mechanism or any mechanism maintaining a position until a specific force is applied to the mechanism such as a detent ball and spring mechanism.

The solutions of FIG. 7 and FIG. 8 may be combined.

Figure 9:
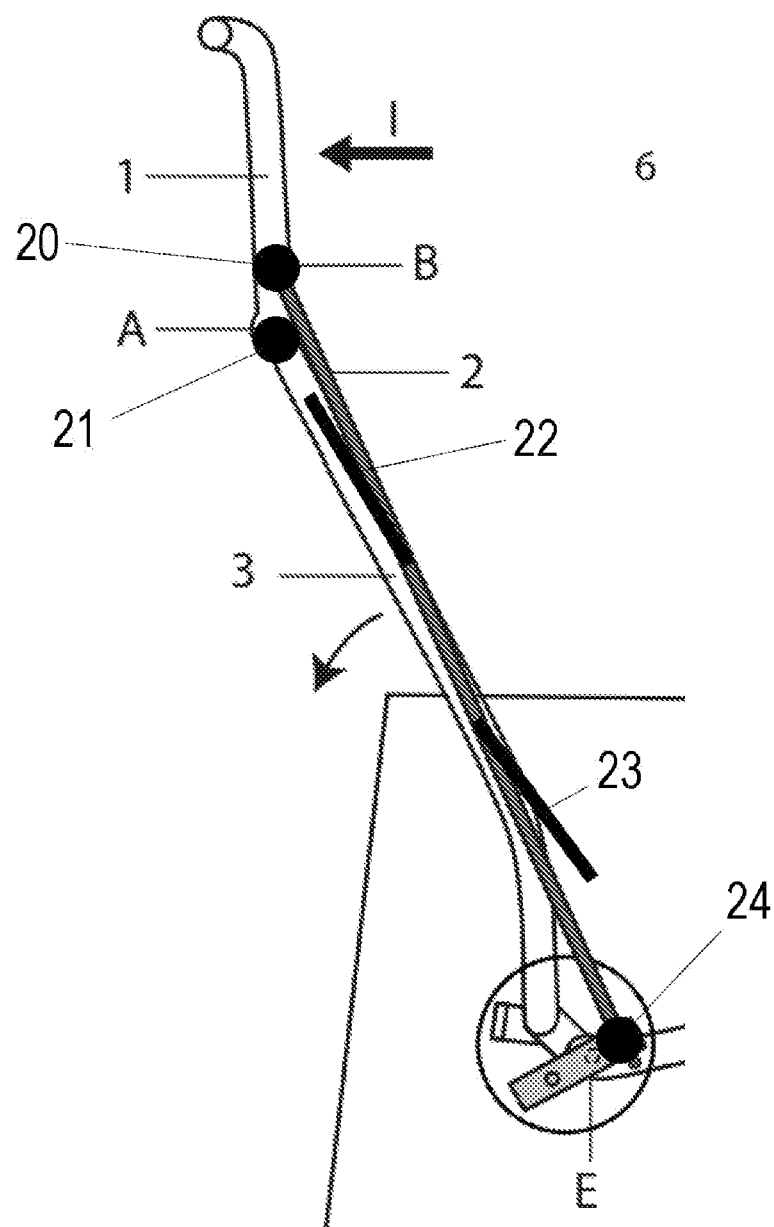
FIG. 9 is a schematic representation of various locations of the alternative locations of the motion resisting element

FIG. 9 disclose a seating device showing alternative locations of the motion resisting element resisting motion between the motion head frame 1 and the back frame 3. The location of the element resisting motion may alternatively be location 23 between the pulling element 2 and the base 5, location 22 between the pulling element 2 and the back frame 3, location 21 in the third pivot point (A) where the head frame 1 is hinged to the upper end of the back frame 3, location 20 between the sixth pivot point (B) between the head frame 1 and pulling element 2 and location 24 between the motion control lever and the pulling element 2.

A mechanically connection of the engagement element (12) to the reclining back frame (3) may involve that the engagement element (12) forms a part of the reclining back frame (3), that it is attached to the reclining back frame (3) or that it includes some kind of linkage system to the reclining back frame (3). Similarly does a mechanical connection of an impact face (13) to the pivoted motion control lever (7) involve that impact face (13) forms a part of the pivoted motion control lever (7), that it is attached to the pivoted motion control lever (7) or includes some kind of linkage system to the pivoted motion control lever (7).

The invention can be located at different places on a seating device with a movable back frame and will work with both a movable seat and with a fixed seat. In some cases, a seating device does not have one physical pivot point connecting it to the back frame, but includes several moving parts which create an invisible pivot point such as e.g. typical American types of mechanisms. The invention will also work in such cases if the components are located correctly in relation to the invisible pivot point.

The pulling element 2 may be placed behind, in front of, above or below the pivot points A and E. If it is located behind the pivot points, i.e. opposite of the outlined solution, it will be possible to achieve the same functionality only with the opposite direction of the forces.

The counterforce (II) from the motion resisting element can be applied to the motion control lever 7, the pulling element 2, at all pivot points or at other locations which cause the motion control lever 7 to be held in position against the stop element 8. The counterforce (II) or the motion control element can be at least one of compression spring, tension spring, torsion spring, elastic element, pneumatic unit, detent ball and spring mechanisms or the like.

The invention claimed is:

1. A seating device comprising a seat (4), a reclining back frame (3), a head frame (1) and a base (5), the back frame (3) being pivotally attached relative to the base (5) in a first pivot point (E), and the head frame (1) is hinged to an upper end of the back frame in a third pivot point (A), wherein the back frame (3) is adjustable between an upright position with the head frame (1) in an upright position, a reclined position with the head frame (1) in an upright position, and a further reclined sleeping position, wherein the seating device further includes;
   a motion control lever (7) pivotally attached to the base (5) in a fourth pivot point (D);
   a motion resisting element resisting motion between head frame (1) and the back frame (3);
   a pulling element (2) extending from a fifth pivot point (F) on the motion control lever (7) to a sixth pivot point (B) on the head frame;
   an engagement element (12), mechanically connected to the reclining back frame (3);
   an impact face (13) mechanically connected to the pivoted motion control lever (7); and
   wherein the impact face (13) and the motion control lever (7) are adapted to be out of mechanical contact when the back frame (3) is in the upright position with the head frame (1) in an upright position and is adapted to be in mechanical contact when back frame (3) is moved between a reclined position with the head frame (1) in an upright position and a further reclined sleeping position, whereby the head frame (1) is pushed back to a further reclined sleeping position.

2. The seating device according to claim 1, wherein the motion resisting element resisting motion between the head frame (1) and the back frame (3) is located to resist motion between at least one of: the motion control lever (7) and the base (5), the pulling element (2) and the base (5), the pulling element (2) and the back frame (3), in the third pivot point (A) where the head frame (1) is hinged to the upper end of the back frame (3), the motion control lever (7) and the pulling element (2) and the sixth pivot point (B) between the head frame (1) and the pulling element (2).

3. The seating device according to claim 1, wherein the back frame (3) includes a release arm (6) which engages the motion control lever (7), and wherein the engagement element (12) is located on the release arm (6).

4. The seating device according to claim 1, wherein the motion resisting element may comprise at least one of a friction-exerting element (9, 11), a compression spring (9), a tension spring (9) a torsion spring (11), an elastic element (9), a pneumatic unit (9) and a detent ball and spring mechanism (9, 11).

5. The seating device according to claim 1, wherein the seat (4) is movable relative to the base (5).

6. The seating device according to claim 4, wherein the seat (4) is hinged to a lower end of the back frame (3) in a second pivot point (C).

7. The seating device according to claim 1, wherein the seat (4) forms part of the base (5).

8. The seating device according to claim 1, wherein the first pivot point (E) is provided by several movable parts which create an invisible pivot point.

9. The seating device of claim 1, further including a stop element (8) secured to the base (5), adapted to limit a deflection of the motion control lever (7).

10. The seating device of claim 1, wherein the seating device is purely mechanical.

* * * * *